June 30, 1970 P. RAPISARDA 3,517,410
APPARATUS FOR PRODUCING REINFORCED APERTURES
IN PLASTIC MATERIALS
Filed Feb. 17, 1967 2 Sheets-Sheet 1

INVENTOR.
Paul Rapisarda
BY
Paul Fields
ATTORNEY

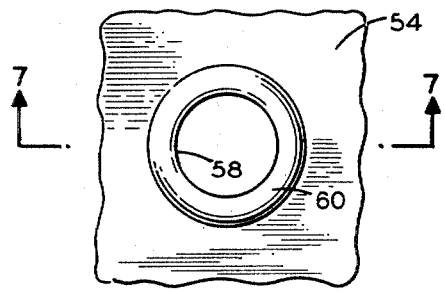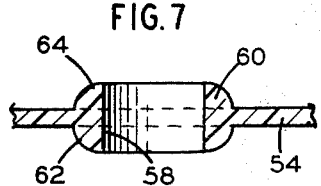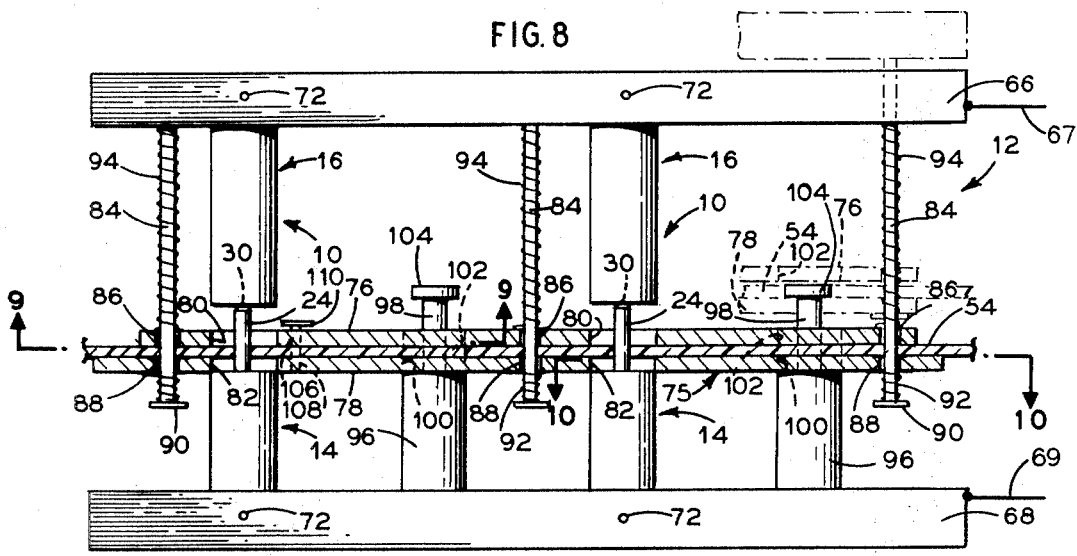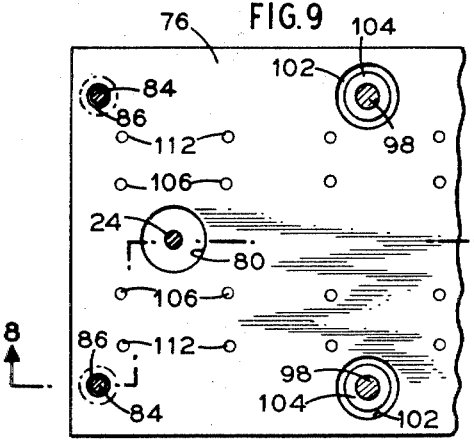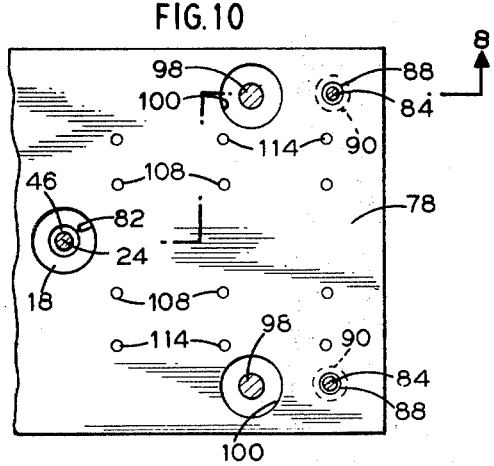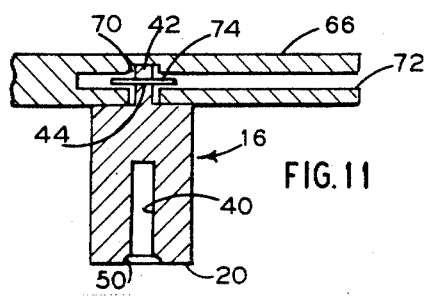

United States Patent Office 3,517,410
Patented June 30, 1970

3,517,410
APPARATUS FOR PRODUCING REINFORCED APERTURES IN PLASTIC MATERIALS
Paul Rapisarda, 4412 Fort Hamilton Parkway, Brooklyn, N.Y. 11219
Filed Feb. 17, 1967, Ser. No. 616,905
Int. Cl. B29c *17/08*
U.S. Cl. 18—1                    11 Claims

ABSTRACT OF THE DISCLOSURE

A die and a jig therefor wherein the die includes a male member having a piercing means and a female member having a bore which slidably receives the piercing means. The piercing means is adapted to first pierce a plastic sheet to displace material therefrom thereby to provide an aperture in the sheet. The male and female members are then moved toward each other to compress the displaced material into a recess which surrounds the piercing means. When heat energy is applied to the die the displaced material forms a bead about the periphery of the aperture thereby to provide a reinforced aperture in the plastic strip.

BACKGROUND OF THE INVENTION

The present invention relates generally to an apparatus for providing reinforced apertures in plastic materials such as vinyl plastic and the like, and, more particularly, pertains to a means for forming an aperture having a bead about its inner peripheral wall in such materials.

In a great many applications, it is highly desirable to provide apertures in relatively thin gauge thermoplastic materials. For example, in order to prevent the build-up of air pressure and the consequent explosion of plastic seat covers and the like, it has long been common practice to provide such seat or furniture covers with apertures to provide a path for the expulsion of the air. In other words, the apertures provide a means for the escape of air to decrease the sudden rise of air pressure within the cover as when a person suddenly sits on a covered article. However, it has been found that after a relatively short period of use of such covers, radial tear lines which extend outwardly from the apertures begin to develop in the material. Eventually, these tear lines extend completely across the cover, thereby causing the fabric material of the furniture to be exposed to render the cover unfit for its intended use.

In order to ameliorate the above-described situation, various devices have been proposed to reinforce the walls of the apertures. For example, metal breather eyelets have been utilized in the past by inserting the eyelets into respective apertures and crimping the edges of the eyelets to the material. However, these metal eyelets have a tendency to pop out of the material or to rip the material when the air pressure within the cover rises. Additionally, the extra steps necessary to provide the plastic material with the eyelets makes this solution extremely uneconomical, even in applications other than in furniture covers.

Another aperture reinforcing device which has been utilized heretofore is the provision of conventional tear seals in the plastic material. (The tear seal is a weakened area which is surrounded by a raised rib.) However, this procedure is likewise extremely costly since the seal per se must be removed by an additional step to provide the aperture. Thus, while the above-described procedure initially provides a small degree of reinforcement about the aperture, the benefits to be derived therefrom are more than offset by the cost.

Accordingly, an object of the present invention is to provide an apparatus for economically and efficiently producing reinforced apertures in plastic material.

Another object of the present invention is to provide an apparatus for producing an aperture and a reinforcing bead about the aperture in plastic materials in one operation, thereby eliminating the need to reinforce the aperture by subsequent operations.

A further object and feature of the invention resides in the novel details of construction which provide an apparatus of the type described which produces a reinforcing bead about an aperture in a strip of plastic material which is integral with the plastic material to prevent the subsequent separation therebetween and the concomitant ripping of the material.

In furtherance of the above objects the apparatus of the present invention includes a die comprising a male and a female member having respective male and female sheet engaging surfaces movable toward each other to engage a sheet of plastic material positioned therebetween. The male member includes a piercing means for displacing a portion of the material forming the plastic sheet to provide an aperture in the sheet. The female member includes a bore which is adapted to slidably receive the piercing means. A wall or bead forming means is defined in at least one of the male and female members for receiving and positioning the displaced material about the aperture. Heat energy is then applied to the die so that the compressed material becomes pliable and assumes the shape of the wall forming means to produce a wall which reinforces the aperture, thereby to eliminate damage to the sheet due to the development of tear lines and the like.

Additionally, the apparatus of the present invention may include a jig to operate the die between its open and closed positions. The jig includes opposed platens respectively mounting the male and female members. A guide is connected to one of the platens for operatively positioning the strip of plastic material with respect to the die. In operation, the platens are moved together so that the piercing means pierces the strip of plastic material. Continued movement of the platens in the same direction causes the female member to compress the displaced material into the wall forming means. The jig is sized and positioned so the female member engages the male member only after the sheet has been pierced to insure that the displaced material will be received in the wall forming means and will not be received in the area between the piercing means and the walls defining the bore in the female member.

The above and other features and advantages of the present invention will become more apparent from a consideration of the following detailed description when taken in conjunction with the accompanying drawings, in which:

FIG. 6 is a top plan view of a portion of a strip of plastic material provided with a reinforced aperture in a plastic strip;

FIG. 7 is a sectional view taken along the line 7—7 of FIG. 6;

FIG. 8 is a front elevational view of a jig to a reduced scale, for the die shown in FIGS. 1–5, with portions thereof being shown in section as indicated by the line 8—8 in FIGS. 9 and 10;

FIG. 9 is a sectional view of the plastic strip guide shown in FIG. 8, taken along the line 9—9 of this figure;

FIG. 10 is a sectional view taken along the line 10—10 of FIG. 8, showing the bottom portion of the plastic strip guide; and FIG. 11 is a vertical sectional view of a portion of the jig and dies shown in FIG. 8, illustrating the movable connection between the jig and the die.

Figure 1:
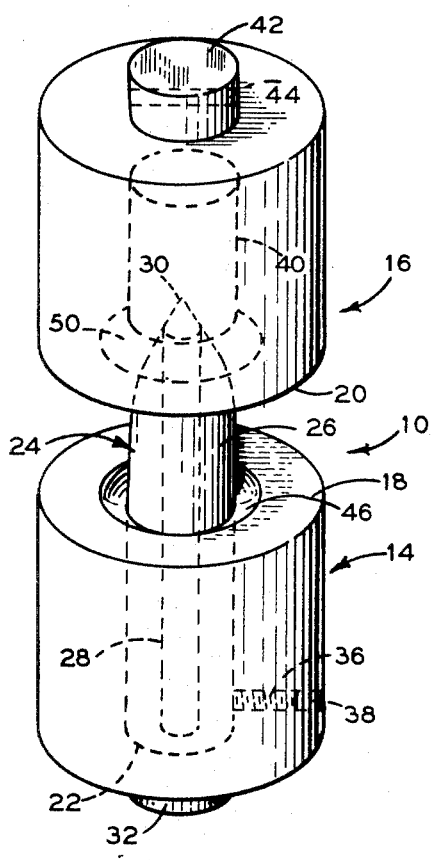
FIG. 1 is a perspective view, of a die constructed in accordance with the present invention.
Figure 2:
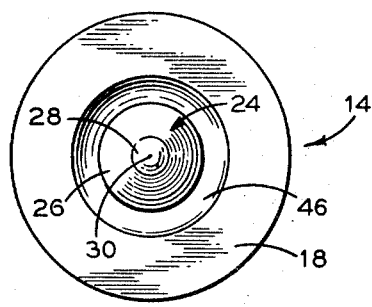
FIG. 2 is a top plan view of the male member of the die, shown in FIG. 1.
Figure 3:
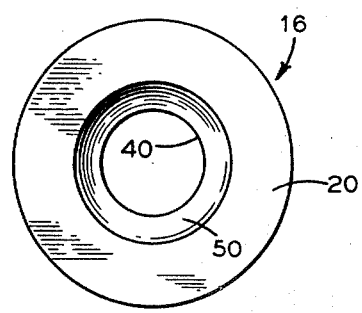
FIG. 3 is a bottom plan view of the female member of the die.

The apparatus of the present invention includes a die as shown in FIGS. 1–5, which is designated generally by the reference numeral 10, and a jig therefor which is shown in FIGS. 8–11 and designated generally by the reference numeral 12. The jig 12 is adapted to operate the members comprising the die 10 between an open and a closed position to produce a reinforced aperture in a sheet of plastic material.

Figure 4:
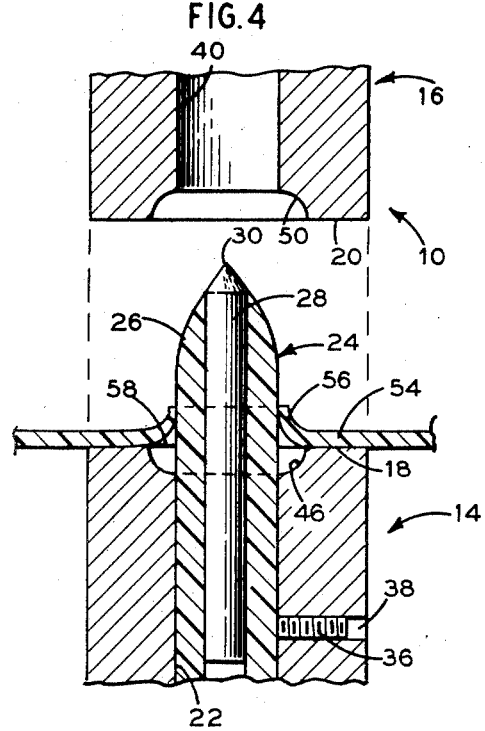
FIG. 4 is a vertical sectional view of the die in the open position, with parts broken away.
Figure 5:
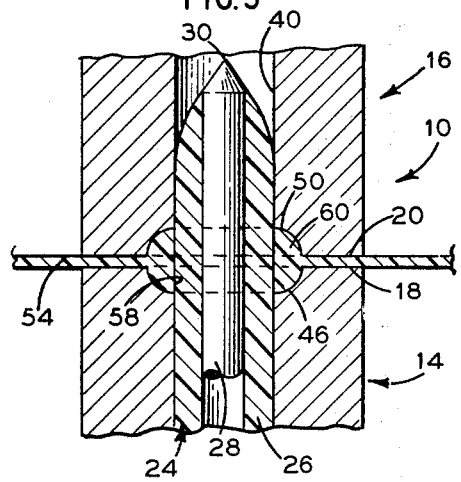
FIG. 5 is a vertical sectional view of the die with parts broken away, showing the die in the closed position and illustrating the formation of a reinforced aperture in a plastic strip.

More specifically, the die 10 includes a lower male member 14 and an upper female member 16, which are fabricated from a metal such as brass. As shown more particularly in FIGS. 1, 2 and 3, the members 14 and 16 are cylindrical in shape. The member 14 is provided with a sheet engaging surface 18 on its upper edge and the female member 16 is provided with a sheet engaging surface 20 on its lower edge. When the male and female members 14 and 16 are positioned for operation, as shown in FIGS. 1, 4 and 5, the sheet engaging surfaces 18 and 20 are in facing relationship to each other to engage a sheet of plastic material which may be positioned between these surfaces.

Centrally located in the male member 14 is a bore 22 which extends downwardly from the sheet engaging surface 18 and terminates above the bottom surface of the member. Removably received within the bore 22 is a piercing member in the form of a post 24 which extends upwardly beyond the sheet engaging surface 18. The post 24 comprises an outer sleeve 26 fabricated from an electrically insulating material such as nylon, and an inner metal core 28 which projects above the upper edge of the sleeve 26 to reduce wear on the sleeve and which is spaced above the bottom surface of the sleeve 26 so that the core is completely insulated from the male member 14. The upper surfaces of the core 28 and the sleeve 26 form a continuous upwardly inwardly tapered surface and the core 28 terminates in a pointed tip 30. The tip 30 of the core 28 is adapted to pierce a sheet of plastic material 54 to provide an aperture in the sheet. As the sheet 54 rides downwardly on the post 24, the gradually enlarging diameter of the post 24 causes the material forming the sheet to be displaced upwardly to provide an upwardly extending ring of material 56, as shown in FIG. 4, thereby enlarging the diameter of the aperture to the desired size.

As noted hereinabove, the piercing member or post 24 is removable and may be replaced when it is worn out. The post is maintained in place in the bore 22 by a set screw 36 which is threadedly received in a transverse passage 38 in the wall of the member 14. Thus, the member 24 may be removed by loosening the set screw 36 and may be affixed in place by tightening the set screw 36 so that it abuts the sleeve 26.

Depending from the bottom surface of the male member 14 is a centrally located post 32 which is provided with a transverse through passage (not shown). The post 32 and the passage therein provide a means for movably mounting the male member on the jig 12.

The female member 16 of the die 10 includes a central bore 40 which extends upwardly from the sheet engaging surface 20 and terminates in spaced relation to the top surface thereof. The bore 40 is sized and positioned to slidingly receive the piercing member or post 24 when the die is closed (i.e., when the male and female members of the die are moved toward each other).

Similarly to the male member 14, the female member 16 includes a centrally located post 42 upstanding from the top surface of the member. Provided in the post 42 is a transverse passage 14. The post 42 and the passage 44 provide a means for movably connecting the female member 16 to the jig 12, as noted in greater detail hereinbelow.

Although the bores 22 and 40 in the respective male member 14 and the female member 16 have been disclosed as terminating in spaced relation to a respective surface of the members, it should be noted that is by way of illustration only. That is, in order to facilitate machining of the members, axially extending through bores may be provided.

Provided in the sheet engaging surface 20 of the male member 14 is an annular recess 46 which surrounds the piercing member 24 and is coaxial therewith. In practice, the wall defining the recess 45 is rounded and has a relatively small radius of curvature. Provided in the sheet engaging surface 20 is a similar annular recess 50 which is formed complementary to recess 46. The recess 50 is coaxial with the bore 40 and, like the recess 46, the wall defining the recess is rounded. As shown in FIG. 5, the recesses 46 and 50 are sized and positioned to define a cavity which extends above and below the sheet engaging surfaces 18 and 20 of the respective members 14 and 16 of the die 10. Additionally, it will be noted that the cavity surrounds the piercing member 24 when the die 10 is moved to the closed position.

In operation, the die 10 is normally in the open state shown in FIG. 4, wherein the female member 16 is spaced above the piercing member or post 24. The sheet of plastic material 54, such as vinyl plastic or some other type of thermoplastic material is placed between the members 14 and 16 and is moved downwardly toward the sheet engaging surface 18 of the male member 14. As the sheet moves downwardly the pointed tip 30 of the metal core 28 engages the plastic sheet 54 and pierces the same to provide an aperture therein. The continued downward movement of the sheet 54 causes the material surrounding the pierced area on the sheet to be displaced upwardly from the plane of the sheet 54 in the manner noted above, to provide a circular ring of upwardly extending displaced material 56. The upward displacement of the material 56 is aided by the tapered upper portion of the core 28 and nylon sleeve 26. The downward movement of the sheet 54 is continued until it seats on the sheet engaging surface 18 of the male member 14.

The die 10 may then be closed by moving the male and female members 14 and 16 toward each other so the piercing member 24 is received in the bore 40. Continued movement of the members toward each other causes the bottom wall of the recess 50 in the female member 16 to engage the upper edge of the upwardly extending displaced material 56 to compress the displaced material into the complementary formed recesses 46 and 50. The movement of the members 14 and 16 continues until the sheet 54 is firmly clamped between the sheet engaging surfaces 18 and 20. Heat energy in the form of radio frequency energy or the like is then applied to the male and female members 14 and 16 to cause the displaced material 56 to flow until it assumes the shape of the cavity formed by the recesses 46 and 50. Thus, as shown in FIG. 5, the displaced material 56 will fill the recesses 46 and 50 to provide a bead or a wall 60 which surrounds the piercing member 24 and which extends above and below the plane of the sheet of plastic material 54. Thereafter, the male and female members 14 and 16 are moved away from each other to the die open position and the sheet of plastic material 54 is moved upwardly and until it clears the piercing member or post 24.

Accordingly, as shown in FIGS. 6 and 7, the sheet of plastic material 54 will be provided with a reinforcing bead or wall 60 which defines the aperture 58 to prevent the material surrounding the aperture from tearing or ripping due to continued use of the material. Moreover, it is to be noted that the aperture 58 and the reinforcing bead or wall 60 is provided in one simple operation thereby making the present method extremely economical and efficient.

It is further to be noted that the rounded walls defining the respective recesses 46 and 50 provide respective lower and upper round edges 62 and 64 on the bead 60 to facilitate removal of the sheet of plastic material 54 from the guide 10. Moreover, the rounded edges of the bead or wall 60 eliminate the possibility of these raised edges cutting into and damaging the furniture fabric material when the apertured sheet is used for plastic covers, etc.

As noted above, the jig 12 is adapted to operate the die 10 between its die open and die closed positions. The jig 12 is shown in detail in FIGS. 8–11 and may mount a plurality of dies 10 which are approximately centerally located intermediate the front and rear edges of the jig. The dies 10 are longitudinally spaced from each other in accordance with the desired spacing between the apertures in the sheet or strip of plastic material. Although only two dies are shown in FIG. 8 it is to be understood that this is by way of illustration only and is not to be interpreted as being a limitation on the present invention. That is, the jig 12 may mount more than two dies 10 or may mount only a single die.

In particular, the jig 12 includes an upper heat energy conducting platen 66 which mounts the female members 16 of the dies 10 and a lower heat energy conducting platen 68 which mounts the male members 14 of the dies. The members 14 and 16 are movably mounted on their respective platens in heat exchanging relationship therewith so that the die members will be self-aligning and heat energy will be conducted from the platens 68 and 66 to the respective male and female members of the dies in the manner indicated in greater detail below.

The connection between a female member 16 of a die 10 and the platen 66 is shown in FIG. 11, wherein portions of the apparatus have been enlarged to clearly show such connection. It is to be understood that the connection of the remaining male and female members and the respective platens 68 and 66 are similar. More particularly, the platen 66 is provided with a bore 70 which movably receives the upstanding post 42 therein. In other words, the bore 70 is of slightly greater dimension than the post 42 so that the female member will be movable on the platen 66. A transverse passage 72 is provided in the platen 66 which extends from the just beyond the bore 70 to the front edge of the platen. The passage 44 in the post 42 is aligned with the passage 72. A pin 74 having a diameter smaller than the diameter of the passage 72 is inserted through the passage 72 into the passage 44 in the post 42. It is to be understood that the pin 74 may be threadedly or otherwise fixedly received in the passage 44. The length of the pin 74 is in excess of the diameter of the post 42 and the bore 70 so that the pin 74 will be extend beyond the edges of the bore 70 when it is received in the passage 44. The pin 74 is adapted to abut the lower wall of the passage 72 to prevent removal of the post 42 from the bore 70.

The spacing between the post 42 and the bore 70 will provide limited movement of the member 16. Hence, when the jig 12 is operated to close the dies 10, the pointed tip 30 of piercing member 24 of each of the male members 14 enters the bore 40 associated with the respective female member 16. As the dies 10 close, the enlarged diameter portion of the piercing members 24 are received in the respective bores 40. Accordingly, the respective piercing members 24 will exert a force on the associated female members to move the female member into exact alignment with the associated male members 14. Thus, the above-described connection provides a means for causing the members comprising a die 10 to be self-aligned.

The jig 12 further includes a sheet or strip guide which is designated generally by the reference numeral 75 in FIG. 8. The strip guide 75 is adapted to position and guide the movement of the sheet or strip of plastic material 54 through the jig. The strip or sheet 54 may be in the form of a roll of plastic material (not shown) which is fed to the strip guide 75 and, after the apertures are formed in the strip 54, the strip may then be moved so that a new section of the roll is received in the jig 12. The finished section may similarly be formed into a roll (not shown) to provide a roll of plastic material having reinforced apertures therein.

More particularly, the strip guide 75 includes an upper plate 76 and a lower plate 78 which are adapted to receive the strip of plastic material 54 therebetween. The strip guide 75 is substantially coextensive with the platens 66 and 68 and is movably connected to the upper platen 66 by a plurality of depending, longitudinally spaced posts 84 which are positioned adjacent the front and rear edges of the platen 66 (FIG. 9). The posts 84 extend through apertures 86 in the upper plate 76 and aligned apertures 88 in the lower plate 78 and terminate in circular enlarged heads 90 having diameters larger than the diameters of the apertures 88. The strip guide 75 is spaced from the heads 90 by respective springs 92 which abut the lower plate 78. Springs 94 extends between the upper plate 76 of the strip guide 75 and the platen 66. The springs 92 and 94 bias the plates 76 and 78 toward each other so the sheet 54 will be firmly gripped therebetween.

Upstanding from the platen 68, and positioned between each pair of posts 84 is a post 96. The posts 96 are located adjacent the front and rear edges of the platen 68. The posts 96 include a small diameter portion 98 which extends through respective apertures 100 in the lower plate 78 of the strip guide 75 and enlarged diameter apertures 102 in the upper plate 76. The portions 98 of the posts 96 terminate in enlarged circular heads 104 which are sized to pass through the apertures 102 but are of larger diameter than the apertures 100 (see FIGS. 8, 9 and 10).

The strip or sheet guide 75 is adapted to be moved vertically with respect to the members 14 and 16 in the manner noted hereinbelow. Accordingly, the upper plate 76 is provided with bores 80 which are aligned with the members 16 and through which the female members are adapted to pass. Similarly, the lower plate 78 is provided with bores 82 which are aligned with the respective members 14 and through which these members are adapted to pass.

The jig 12 may be utilized to provide reinforced apertures in strips or sheets of plastic material having a plurality of different widths. In order to insure that the apertures are located approximately in the center of the strip of plastic material, a positioning means is provided to guide and position the strip during its passage through the strip guide 75.

More particularly, as shown in FIGS. 9 and 10, a row of spaced through bores 106 are positioned on each side of the through bore 80 in the upper plate 76 of the strip guide 75. Similarly, rows of longitudinally spaced through bores 108 are provided in the lower plate 78 on each side of the through bores 82. The bores 108 are aligned with respective ones of the bores 106, so that a pin, such as the pin 110 shown in FIG. 8, will extend through the bore 106 and will be received in the bore 108 in the lower plate 78. Each pair of aligned bores 106, 108 is adapted to receive a pin 110, to define the edges of a track between the upper and lower plates 76 and 78 to position a strip of plastic material 54, having a width substantially equal to the transverse distance between the bores 106, so that the reinforced apertures will be approximately centrally located in the strip.

Additionally, rows of bores 112 are provided in the upper plate 76 on each side of the through bore 80 and at a greater distance therefrom than the bores 106. Similarly, rows of longitudinal spaced bores 114 are provided in the lower plate 78 on each side of the bore 82, and are spaced a greater distance therefrom than the bores 108. Each bore 114 is aligned with a different bore 112. Accordingly, if the width of a strip of material which is to be provided with the reinforced apertures is substantially equal to the transverse distance between the rows of bores 112 and 114, and then the pins 110 may be inserted through the bores 112 and 114 to define a track having a substantially greater width than the track defined by the bores 106, 108. Thus simply by moving the pins 110 from one set of bores 106, 108 to another set of bores 112, 114, the jig 12 is adapted to be used in conjunction with a strip of material having a different width. Additionally, other rows of aligned bores may be provided in the respective plates 76 and 78 which are located at different transverse distances from the bores 80 nad 82 to define tracks having different widths thereby to increase the versatility of the device of the present invention.

In operation, the jig 12 may be mounted in a conventional press (not shown). For example, the upper platen 66 may be connected to one jaw of the press and the lower platen 68 may be connected to the other jaw of the press. Either one or both jaws of the press may be movable so that the platens 66 and 68 are movable toward and away from each other.

Initially, the pins 110 are inserted into the desired rows of apertures 106, 108 or 112, 114, to define a track between the plates 76 and 78 which is substantially equal to the width of the strip or sheet of plastic material 54. Thereafter the platen 66 is moved upwardly relative to the platen 68 until the heads 104 of the posts 96 pass through the apertures 102 and engage the lower plate 78 of the strip guide 75, as shown in phantom in FIG. 8, to limit further upward movement of this plate. Thus, continued upward movement of the platen 66 will cause the posts 84 to move upwardly relative to the plate 78 thereby compressing the springs 92 and allowing the springs 94 to expand. The biasing force which biases together the plates 76 and 78 accordingly will decrease so that the sheet 54 easily may be inserted between the plates of the strip guide 75.

After the strip has been positioned in the manner noted above, the platen 66 is moved downwardly relative to the platen 68 until the pointed tip 30 of the piercing members 24 pass through the respective bores 82 and pierce the strip of material 54 to displace the material 56 and form the apertures in the strip 54 in the manner noted hereinabove in conjunction with the description of the operation of the die 10. The continued downward movement of the platen 66 will cause the lower surface of the plate 78 to abut the top surface of the enlarged diameter portion of the posts 96 to limit further downward movement of the strip guide 75. In practice, the top surfaces of the enlarged diameter portion of the posts 96 are coplanar and slightly lower than the height of the sheet engaging surfaces 18 of the male members 14 of the dies 10 so that when the downward movement of the strip guide 75 is arrested by the posts 96, the sheet engaging surfaces 18 will abut the strip of plastic material 54.

As the platen 66 continues its downward movement, the female member 16 receives the piercing member 24 in the bore 40 while the posts 84 move downwardly relative to the strip guide 75 thereby compressing the springs 94. It should be noted that the springs 94 have sufficient tension to maintain the downward movement of the strip guide as the piercing members 24 pierce the sheet of plastic material without being compressed during this portion of the operation of the device. Thus, albeit the strip guide 75 is in effect floating on the springs 92 and 94, the posts 84 will not move relative to the strip guide until the movement of the strip guide is arrested by the enlarged portions of the posts 96.

The downward movement of the female member 16 causes the displaced material 56 to be compressed into the recesses 46 and 50 in the manner noted hereinabove. The posts 84 are sized so that the heads 90 of the posts 84 engage the platen 68 to limit the movement of the platens toward each other when the displaced material is compressed the to aforementioned recesses and the sheet 54 is gripped between the sheet engaging surfaces 18 and 20 of each die 10, it being understood that the respective sheet engaging surfaces of the dies are coplanar.

Thereafter, heat energy in the form of radio frequency or the like from an appropriate source (not shown) is applied to the platens 66 and 68 (via the jaws of the press or leads 67 and 69) which transmit the heat energy to the respective female and male members 16 and 14 to cause the material received within the recesses to flow and form the reinforcing bead or wall 60.

Thereafter, the platen 66 is moved upwardly relative to the platen 68. Thus, the posts 84 will move upwardly relative to the strip guide 75 until the springs 92 are compressed sufficiently to exert a force against the bottom plate 78 to cause the strip guide to move upwardly. The strip guide 75 will move upwardly until it is spaced above the piercing members 24 and the enlarged diameter heads 104 of the posts 96 again engage the lower plate 78 of the strip guide 75 to limit the upward movement of the lower plate. Thus, further upward movement of the platen 66 will decrease the pressure between the upper and lower plates 76 and 78 of the strip guide 75 thereby allowing the strip of plastic material 54 to be advanced. The cycle may again be repeated until a roll of plastic material having reinforced apertures therein has been provided.

Accordingly, a method and an apparatus have been described for producing reinforced apertures in plastic material in a single operation, thereby providing an efficient and an economical operation.

While preferred embodiments of the invention have been shown and described herein it will become obvious the numerous omissions, changes and additions may be made in such embodiments without departing from the spirit and scope of the present invention.

What is claimed is:

1. A die for forming a reinforced aperture in a plastic sheet comprising a male and a female member having respective male and female member sheet engaging surfaces movable toward each other to engage a sheet of plastic positioned therebetween, said male member having piercing means upstanding from said male member sheet engaging surface for displacing a portion of the material forming the sheet to provide an aperture in the sheet, said female member having a bore for slidably receiving said piercing means therein when said male and female members are moved toward each other, and wall forming means defined in at least one of said male and female member sheet engaging surfaces for receiving and positioning the displaced material about said piercing means, whereby the displaced material assumes the shape of said wall forming means when heat energy is applied to said male and female members to provide a reinforcing wall about said aperture.

2. A die as in claim 1, in which said wall forming means comprises an annular recess coaxial with said piercing means.

3. A die as in claim 2, in which said annular recess extends downwardly and inwardly in said male member from said male member sheet engaging surface to provide a rounded wall surface.

4. A die as in claim 1, in which said wall forming means comprises complementary formed recesses in said male and female member sheet engaging surfaces.

5. A die as in claim 1, in which said piercing means includes an insulating sleeve extending into said male member, and a metal core received in said insulating means and insulated from said male member, said core extending above the top edge of said insulating sleeve and being provided with a piercing point to pierce a plastic sheet, and means for removably mounting said piercing means on said male member.

6. Apparatus for providing reinforced apertures in a sheet of plastic material comprising at least one die operable between a die open and die closed position and a jig therefor;

said die comprising a male and a female member having respective male and female member sheet engaging surfaces movable toward each other to engage a sheet of material when said die is in said die closed position, said male member having piercing means upstanding from said male member sheet engaging surface for piercing a sheet of plastic material and for displacing a portion of the material forming the sheet to provide an aperture in the sheet, said female member having a bore for slidably receiving said piercing means therein when said die is moved to the die closed position, and wall forming means defined in at least one of said male and female member sheet engaging surfaces for receiving and positioning the displaced material about said piercing means;

said jig comprising a pair of platens movable toward and away from each other, mounting means for mounting said male member on one of said platens and for mounting the female member on the other of said platens, guide means intermediate said male and female members for guiding and positioning a strip of plastic material relative to said piercing means, said guide means including bores aligned with said male and female members, and connecting means for movably connecting said guide means with said other plate, whereby initial movement of said platens toward each other causes said piercing means to pass through one of said bores to pierce the sheet received in said guide means and further movement of said platens toward each other causes said female member to compress the displaced material into said wall forming means to form a wall about the periphery of said aperture when heat energy is supplied to said die.

7. Apparatus as in claim 6, in which said male and female members are fabricated from a heat transmitting material, and said platens are fabricated from a metal, said platens being in heat exchanging relationship with said male and female members so that heat energy applied to said platens is transmitted to said die.

8. Apparatus as in claim 6, in which said guide means includes an upper plate and a lower plate adapted to receive a strip of material therebetween, and biasing means for biasing said plates together to frictionally retain a strip of material therebetween.

9. Apparatus as in claim 8, in which said upper and lower plates are provided with a first plurality of aligned rows of longitudinally spaced apertures a first distance on each side of said bores, and a second plurality of aligned rows of longitudinally spaced apertures in said upper and lower plates a second distance on each side of said bores, and a plurality of pins adapted to be received in one of said first and second rows of aligned apertures to define tracks having predetermined widths in said guide means in accordance with the width of a strip of plastic material received between said upper and lower plates.

10. Apparatus as in claim 8, in which said connecting means comprises a plurality of longitudinally spaced posts extending through said upper and lower plates and terminating in an enlarged head; said biasing means comprising a first spring for each post extending between said upper platen and said upper plate, and a second spring for each post extending between the respective enlarged heads and said lower plate to space said guide means from said enlarged heads; a second plurality of posts upstanding from said one platen and extending through said upper and lower plates and terminating in enlarged diameter heads; said upper plate bing provided with apertures having a diameter in excess of the diameters of the heads of said second posts to provide for the passage of said heads therethrough; whereby when said platens are separated, said heads of said second posts engage said lower plate to reduce the biasing force of said first and second springs on said upper and lower plates so that the strip of material may be advanced through said guide means.

11. Apparatus as in claim 6, in which said mounting means for at least one of said male and female members includes an enlarged bore in the associated platen, a post extending from said one member and being movably received in said bore, a transverse passage in said platen communicating with said bore and extending from beyond said bore to the opposite edge of said platen, and a pin having a length in excess of the diameter of said bore and extending through said posts and abutting the wall of said passage to movably support said one member in said passage.

References Cited

UNITED STATES PATENTS

| | | |
|---|---|---|
| 2,115,122 | 4/1938 | Prudden. |
| 2,748,863 | 6/1956 | Benton. |
| 3,187,380 | 6/1965 | Harrison. |
| 3,303,249 | 2/1967 | Strauss. |

WILBUR L. McBAY, Primary Examiner

U.S. Cl. X.R.

18—19; 264—156